United States Patent
Ebert

(10) Patent No.: US 11,150,480 B1
(45) Date of Patent: Oct. 19, 2021

(54) SYSTEMS AND METHODS FOR TRANSLATION OF OPTICAL COMPONENTS

(71) Applicant: Facebook Technologies, LLC, Menlo Park, CA (US)

(72) Inventor: Ryan Michael Ebert, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 162 days.

(21) Appl. No.: 16/280,464

(22) Filed: Feb. 20, 2019

Related U.S. Application Data

(60) Provisional application No. 62/756,170, filed on Nov. 6, 2018.

(51) Int. Cl.
 *G02B 27/14* (2006.01)
 *G09G 5/00* (2006.01)
 *G02B 27/01* (2006.01)

(52) U.S. Cl.
 CPC ..... *G02B 27/0176* (2013.01); *G02B 27/0179* (2013.01); *G02B 2027/0154* (2013.01); *G02B 2027/0178* (2013.01); *G02B 2027/0187* (2013.01)

(58) Field of Classification Search
 CPC ............ G02B 27/0176; G02B 27/0179; G02B 2027/0154; G02B 2027/0178; G02B 2027/0187

USPC .......................................... 359/630; 345/7–9
See application file for complete search history.

(56) References Cited

U.S. PATENT DOCUMENTS

| | | | |
|---|---|---|---|
| 8,705,177 B1* | 4/2014 | Miao | H04N 13/395 359/630 |
| 2012/0113092 A1* | 5/2012 | Bar-Zeev | G02B 27/0101 345/419 |
| 2019/0187482 A1* | 6/2019 | Lanman | G06F 3/011 |

* cited by examiner

*Primary Examiner* — William Choi
(74) *Attorney, Agent, or Firm* — FisherBroyles, LLP

(57) ABSTRACT

The disclosed head-mounted display systems may include an optical element supported by a head-mounted display frame, a projector mounted to the head-mounted display frame, and at least one voice coil actuator mounted on the head-mounted display frame. The projector may be configured to project, via the optical element, an image toward an eye of a user of the head-mounted display system. The at least one voice coil actuator may be coupled to at least one of the projector or the optical element. When actuated, the at least one voice coil actuator may translate at least one of the projector or the optical element in at least one direction relative to the head-mounted display frame. Various other methods, systems, and methods of manufacture are also disclosed.

19 Claims, 15 Drawing Sheets

SYSTEMS AND METHODS FOR TRANSLATION OF OPTICAL COMPONENTS

CROSS-REFERENCE TO RELATED APPLICATION

This application claims the benefit of U.S. Provisional Patent Application Ser. No. 62/756,170, titled "SYSTEMS AND METHODS FOR TRANSLATION OF OPTICAL COMPONENTS," filed Nov. 6, 2018, the entire disclosure of which is incorporated herein by reference.

BACKGROUND

Artificial reality systems, which include systems for augmented reality, virtual reality, and mixed reality, are designed to provide an immersive experience for users by displaying images to a user's eyes. In augmented reality and mixed reality systems, the images may overlay the user's view of the real world, providing an illusion that a virtual object or image exists in three-dimensional (3D) space in front of the user. In virtual reality systems, a 3D virtual environment is presented to the user's eyes and the user's view of the real world may be blocked. In any of these artificial reality environments, the user's experience may be negatively affected if the brain's expectations for image movement are not accomplished. For example, if a user looks from one side to another, the virtual image should move in a complementary fashion. Subtle image changes such as alterations to focus and blur to mimic the user's view of the real world are also important to an immersive user experience.

The human eye can quickly refocus and move to view different objects and images in the real world. Thus, immersive HMD systems may also attempt to change the focus and presented view of virtual images to track the user's eyes. Some conventional HMD systems may suffer from slow response times and inadequate controls. For example, it is difficult to move asymmetric components within HMD systems at a sufficient acceleration and speed and with sufficient precision to correspond to human eye movement.

SUMMARY

As will be described in greater detail below, the present disclosure describes methods and systems for translating an optical element and/or projector of an HMD system.

In some embodiments, HMD systems may include an optical element, a projector, and at least one voice coil actuator. The optical element may be supported by an HMD frame. The projector may be mounted to the HMD frame and may be configured to project, via the optical element, an image toward an eye of a user of the HMD system. The at least one voice coil actuator may be mounted on the HMD frame and may be coupled to the projector and/or optical element such that the at least one voice coil actuator, when actuated, may translate at least one of the projector or the optical element in at least one direction relative to the HMD frame.

In some examples, the optical element may include an optical combiner. The HMD frame may include an eyeglass frame. The projector may be mounted at a temple region of the eyeglass frame. The optical element may be positioned within the frame to be held in front of the eye of the user. The at least one voice coil actuator may include a first voice coil actuator and a second voice coil actuator. The first voice coil actuator may, when actuated, translate at least one of the projector or the optical element in a first direction. The second voice coil actuator may, when actuated, translate at least one of the projector or the optical element in a second direction that is at least substantially perpendicular to the first direction. The HMD system may also include a guidance subsystem that is positioned and configured to constrain translation of the at least one of the projector or the optical element in a direction that is transverse to the at least one direction in which the projector and/or the optical element is translated.

In some examples, the optical element and the projector may form a projector assembly that is configured to be translated as a unit by the at least one voice coil actuator. The at least one voice coil actuator may, when actuated, translate the projector assembly in the at least one direction. The at least one voice coil actuator, when actuated, may translate the projector assembly in a direction that is at least substantially parallel to a major surface of the optical element.

In some examples, the HMD system may also include an eye-tracking element that is configured to track a position of a pupil of the eye of the user. The at least one voice coil actuator may be configured to translate the at least one of the projector or the optical element to move a pupil replication of the image to be directed to the pupil of the eye of the user. The HMD system may also include a locking system that is configured to lock the at least one of the projector or the optical element in a translated position at least upon powering down the at least one voice coil actuator.

In some embodiments, the present disclosure includes methods for translating an optical component of an HMD system. In accordance with such methods, a projector may be directed to project an image via an optical element to an eye of a user of an HMD system. At least one voice coil actuator may be directed to translate at least one of the projector or the optical element in at least one direction relative to a frame of the HMD system to move a focal point of the image in the at least one direction.

In some examples, the optical element may be an optical combiner. The optical element may be positioned in front of the eye of the user. The projector may be directed to project the image from a location along a temple of an eyeglass frame. Movement of the at least one of the projector or the optical element may be constrained in a direction that is transverse to the at least one direction in which the projector and/or the optical element are translated. Directing the at least one voice coil actuator to translate the at least one of the projector or the optical element in the at least one direction may include directing a first voice coil actuator to translate the at least one of the projector or the optical element in a first direction, and directing a second voice coil actuator to translate the at least one of the projector or the optical element in a second direction. The second direction may be at least substantially perpendicular to the first direction. The first voice coil actuator may be directed to translate the projector and the optical element in the first direction. The second voice coil actuator may be directed to translate the projector and the optical element in the second direction.

In some examples, the at least one voice coil actuator may be directed to translate the at least one of the projector or the optical element in a direction that is parallel to a major surface of the optical element. An eye-tracking element may be directed to track movement of a pupil of the eye of the user of the HMD system. The translation of the at least one of the projector or the optical element in the at least one direction may cause a pupil replication of the image to be directed to the pupil of the eye of the user. A locking system may be directed to lock the at least one of the projector or the optical element in a translated position.

In some embodiments, the present disclosure includes methods of manufacturing an HMD system. In accordance with such methods, an optical element may be coupled to an HMD frame. A projector may be mounted to the HMD frame in an orientation to project an image to an eye of a user via the optical element. At least one voice coil actuator may be coupled to at least one of the optical element and the projector. When actuated, the at least one voice coil actuator may translate at least one of the projector and the optical element in at least one direction relative to the HMD frame. In some examples, an eye-tracking element may be mounted to the HMD frame.

Features of any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
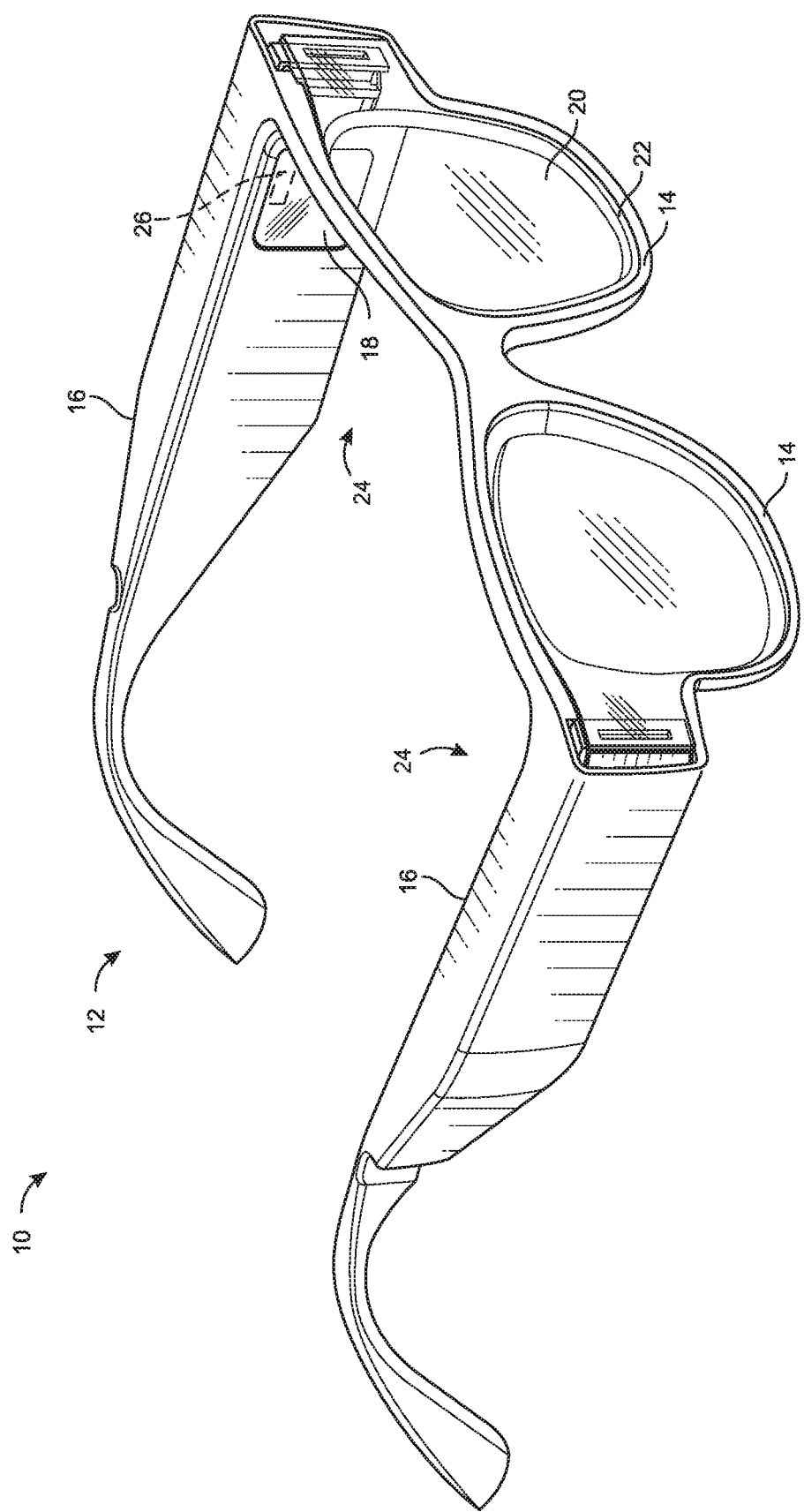
FIG. 1 is a perspective view of an HMD system in an eyeglass configuration, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for translation of a projector and/or an optical element of an HMD system. As will be explained in greater detail below, HMD systems of the present disclosure may include one or more voice coil actuators (VCAs) configured to translate a projector and/or an optical element in one or more directions. The VCAs may operate at sufficient speeds and with sufficient precision to improve the user experience of HMD systems.

The following will provide, with reference to FIGS. 1-20, detailed descriptions of various systems and methods for translation of components of an HMD system. Detailed descriptions of an example HMD system are provided with reference to FIGS. 1-5. In connection with FIGS. 6-12, detailed descriptions of various example mechanisms for translating components of HMD systems are provided. In relation to FIGS. 13-18, detailed descriptions of mechanisms for guiding translation of components of HMD systems are provided. Detailed descriptions of methods for translating an optical component of an HMD system are provided with reference to FIG. 19. With reference to FIG. 20, detailed descriptions of methods of manufacturing an HMD system are provided.

FIG. 1 depicts a head-mounted display (HMD) system 10 according to an embodiment of the present disclosure. The HMD system 10 may include an HMD frame 12 that may have an eyeglass-type configuration with two lens frames 14. In some embodiments, the HMD system 10 may be an augmented reality system that is configured to provide virtual images overlaying the user's view of the real world. The HMD frame 12 may also include temple portions 16 (also referred to herein as "temples 16") extending backward from the lens frames 14 to be positioned over the ears of the user when the HMD system 10 is in use. One or more projectors 18 may be mounted in or on each of the temples 16. The projectors 18 may each be configured to project images to the user's eyes via the respective optical combiners 20 located within the lens frames 14 of HMD frame 12. One or more additional lenses 22 may be located in the lens frames 14 to protect and/or guide the optical combiners 20. The projectors 18 and/or optical combiners 20 may be movable relative to the HMD frame 12. In some embodiments, the projector 18 and optical combiner 20 on each side of the HMD system 10 may be parts of a projector assembly 24 that is movable as a unit relative to the HMD frame 12. Mechanisms for moving at least one of the projector 18 and/or the optical combiner 20 relative to the HMD frame 12 are described below.

The movement of the projector 18 and/or optical combiner 20 may be in response to data corresponding to movement of the user's eye(s), as determined or estimated by an eye-tracking system 26. The eye-tracking system 26 may, for example, include an eye-tracking camera and an infrared (IR) light source. The IR light source may direct light toward the user's eye, such as by reflecting the IR light from the optical combiner 20 or another lens or surface that is reflective to IR light. The eye-tracking camera may sense the IR light reflected from the user's eye to determine or estimate a location of the user's pupil, cornea, and/or retina, for example. The data obtained by the eye-tracking system 26 may then be used to move the projector 18 and/or optical combiner 20 to direct an image reflected from the optical combiner 20 into the user's eye, as further explained below.

Figure 2:
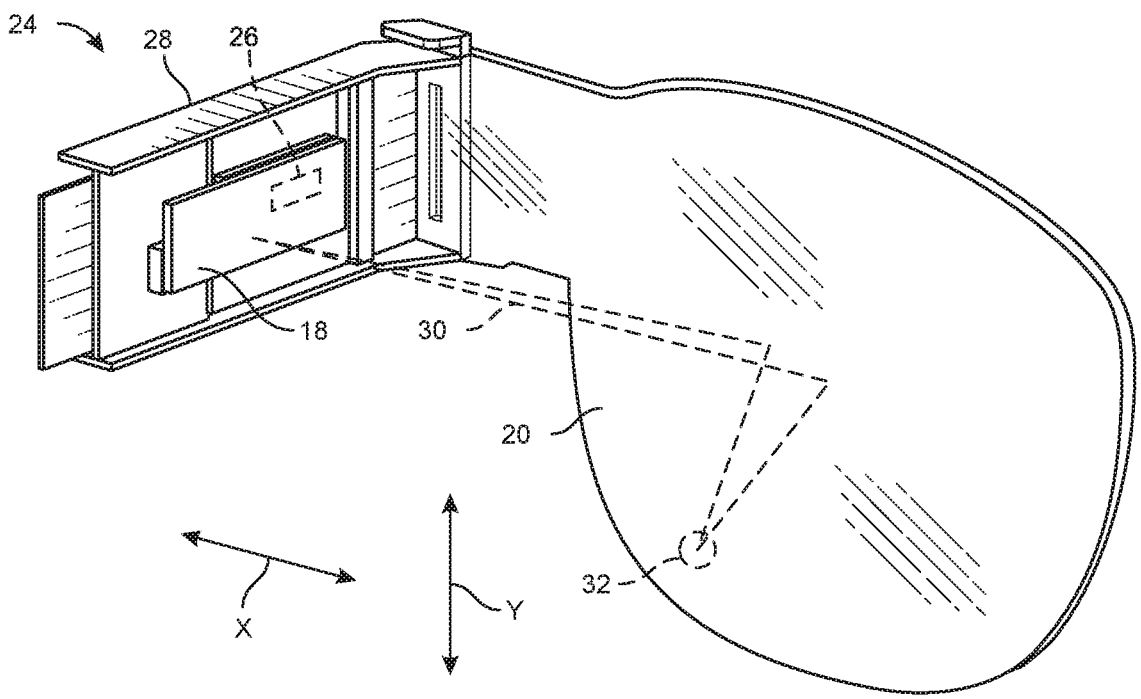
FIGS. 2 and 3 are perspective views of an asymmetric optical component of the HMD system of FIG. 1.
Figure 3:
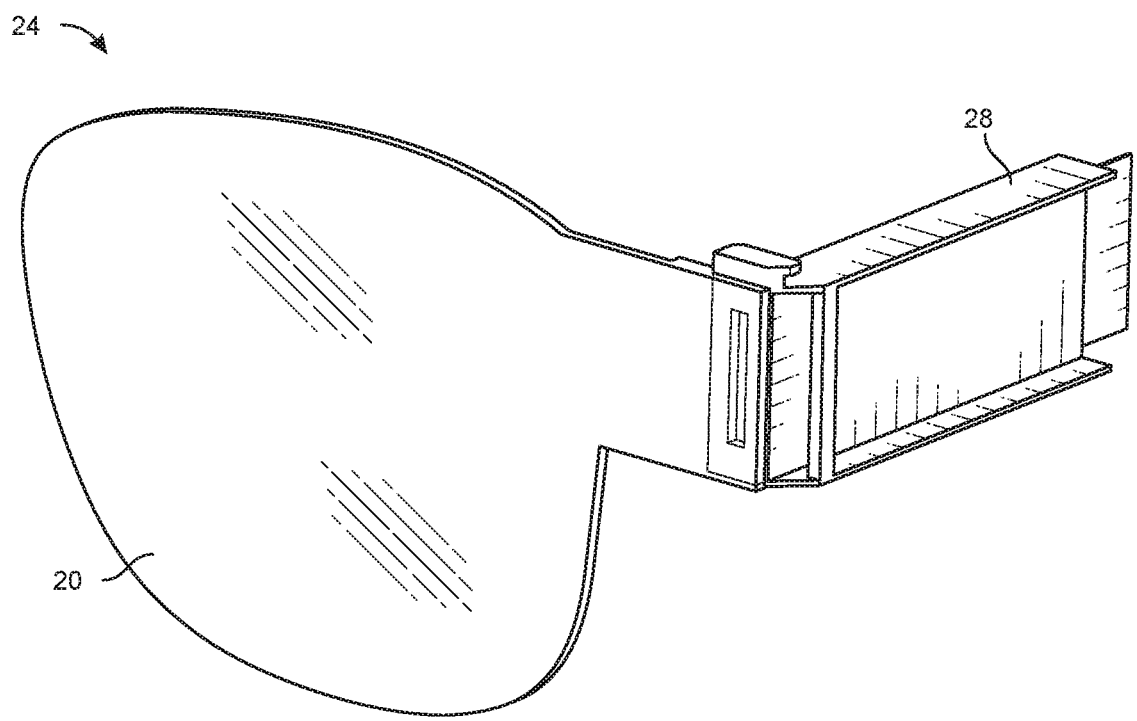

FIGS. 2 and 3 provide perspective views of an example asymmetric optical component including a projector assembly 24. The projector 18 may be attached to a support member 28 that may, in turn, be movably coupled to the temple 16 of the HMD frame 12 (FIG. 1). The projector 18, support member 28, and optical combiner 20 may together form, or form a part of, the projector assembly 24.

As shown in FIG. 2, the projector 18 may be configured to project an image toward the optical combiner 20 to reflect off the optical combiner 20 toward an eye of the user. Projection of the image is shown by dashed projection lines 30 in FIG. 2. After reflecting off the optical combiner 20, the rays of light projected from the projector 18 may converge at or through a pupil replication 32, illustrated in FIG. 2 as a dashed circle. As the HMD system 10 senses, using data from the eye-tracking system 26, movement of the user's eye to the left, right, up, down, or a combination thereof, the HMD system 10 may move the projector 18 and/or the optical combiner 20 (e.g., the projector assembly 24) to position the pupil replication 32 over or approximately over the pupil of the eye of the user. Thus, as the user looks in different directions through the optical combiner 20, the projected image may remain in the user's view. The movement of the projector assembly 24, or a portion thereof, may be sufficiently fast and precise to substantially correspond to movement of the user's eye.

In some embodiments, movement of the projector assembly 24, or a portion thereof, may be substantially constrained to directions parallel to a major surface of the optical combiner 20, such as along the X- and Y-directions depicted in FIG. 2. In some examples, the X-, Y-, and Z-directions are used for convenience and clarity in describing the embodiments depicted in the accompanying drawings and may refer to directions that are transverse (e.g., orthogonal) to each other. In some examples, the X-direction and Y-direction may be parallel to a major surface of the optical combiner and the Z-direction may be perpendicular to the surface. In one example, the X-direction may be substantially horizontal, and the Y-direction may be substantially vertical, relative to an upright user when the HMD system 10 is in use. Of course, if the HMD system 10 is used in other orientations, then the X- and Y-directions may not be respectively horizontal or vertical.

In some examples, the term "substantially" in reference to a given parameter, property, or condition may mean and include to a degree that one skilled in the art would understand that the given parameter, property, or condition is met with a small degree of variance, such as within acceptable manufacturing tolerances. For example, a parameter that is substantially met may be at least about 90% met, at least about 95% met, or at least about 99% met.

Figure 4:
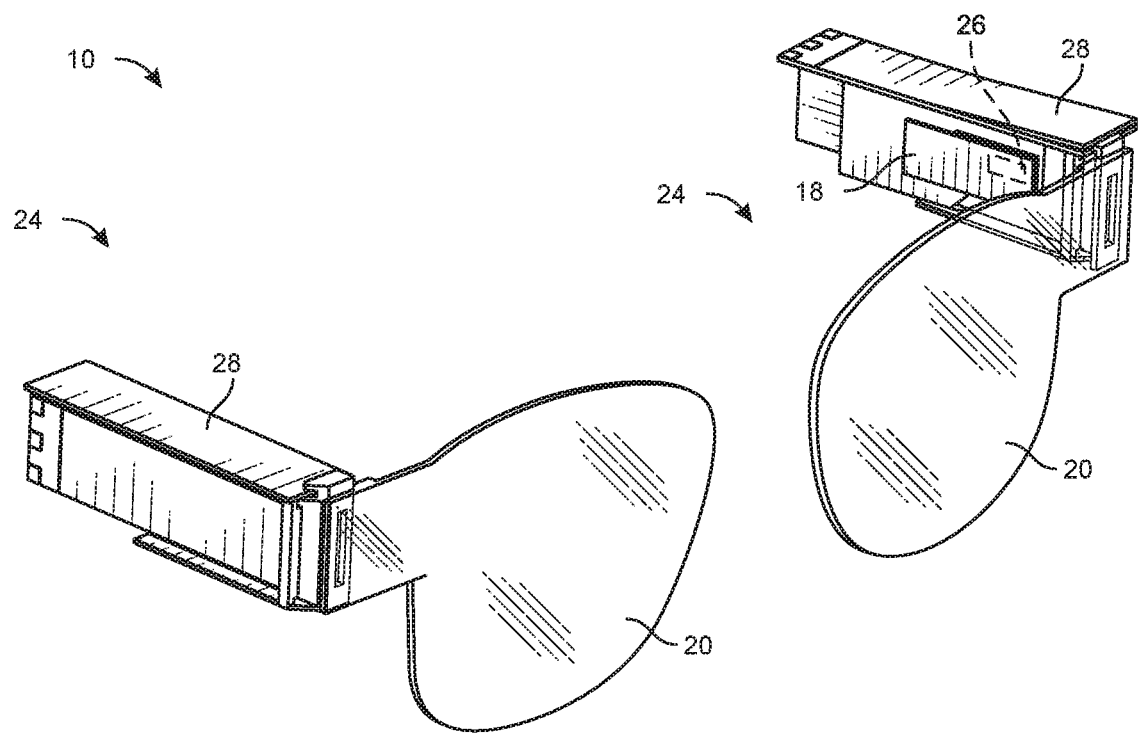
FIG. 4 is a perspective view of two asymmetric optical components the HMD system of FIG. 1.

FIG. 4 depicts two example projector assemblies 24 of an augmented reality system in an eyeglass configuration, similar to FIG. 1, with the HMD frame 12 removed to provide a view of internal components of the HMD system 10.

Figure 5:
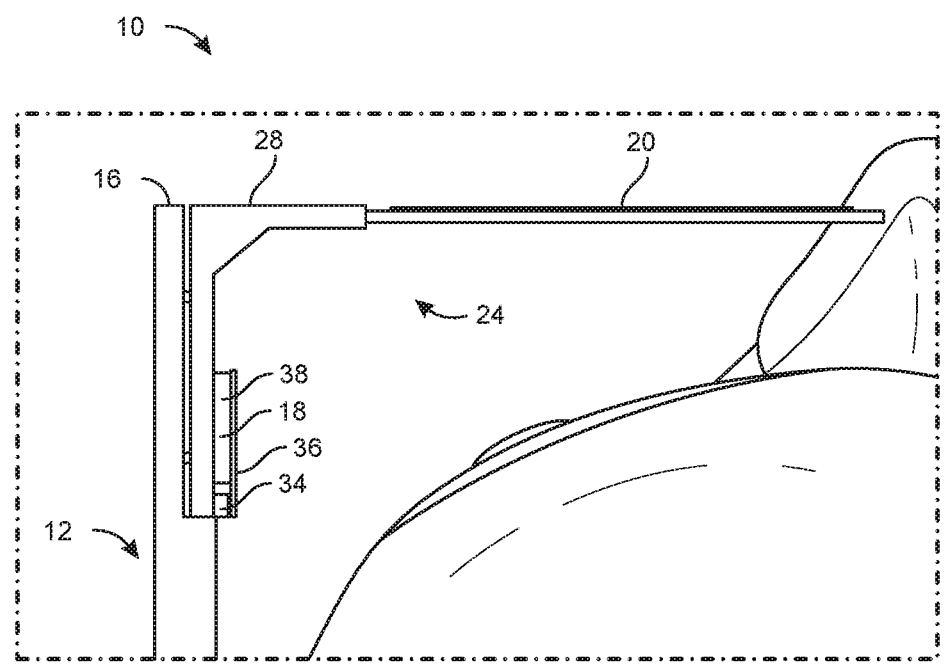
FIG. 5 is a top view of a portion of the HMD system of FIG. 1 while in use by a user.

FIG. 5 depicts an overhead view of the projector assembly 24 positioned on a user. In some embodiments, the projector 18 may include, for example, a light source 34 (e.g., a laser source), a waveguide 36, and/or a projector chip 38 (e.g., an LCoS (liquid crystal on silicon) chip) for projecting an image to the user via the optical combiner 20. FIG. 5 also depicts additional components of the projector assembly 24, such as the support member 28 and the optical combiner 20. The projector assembly 24 may be mounted to, and movable relative to, the temple 16 of the HMD frame 12, and movable relative to the user wearing the HMD system 10.

Figure 6A:
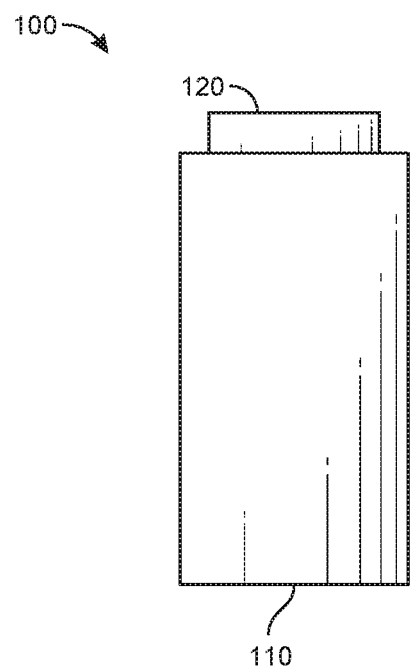
FIGS. 6A and 6B are side views of a voice coil actuator, according to at least one embodiment of the present disclosure.
Figure 6B:
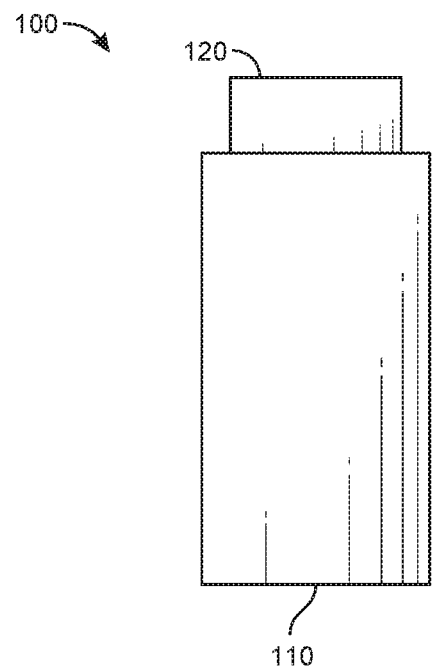

In some embodiments, movement of the projector assembly 24 may be accomplished with one or more voice coil actuators (VCAs). FIGS. 6A and 6B illustrate an example VCA 100. In FIG. 6A, the VCA 100 is in a retracted state, and in FIG. 6B the VCA 100 is in an extended state. The VCA 100 may include a VCA base 110, which may be a ferromagnetic cylinder that houses a tubular coil of wire situated within a magnetic field produced by permanent magnets embedded on an inside diameter of the VCA base 110. A VCA pin 120 may be movable (e.g., retractable and extendible) relative to the VCA base 110 upon activation or de-activation of the VCA 100. Thus, when current flows through the coil within the VCA 100, axial force generated along the coil may produce relative motion between the VCA pin 120 and the VCA base 110. Speed of actuation may depend at least in part on the magnitude of the current flowing through, and the voltage applied to, the coil.

The VCA 100 may use, for example, either a moving coil or a moving magnet. In the case of a moving coil, the VCA 100 may include a stationary field (magnet) and a moving coil winding (conductor) that may produce a force proportional to an electrical current applied to the moving coil winding. The permanent magnet may be attached to an outer soft magnetic return path. In the example depicted in FIGS. 6A and 6B, the VCA pin 120 may be or include the moving coil, and the VCA base 110 may be or include the permanent magnet. Alternatively, in the case of a moving magnet, the VCA pin 120 may be or include the permanent magnet and the VCA base 110 may be or include the moving coil. In either case, the moving coil may, in some examples, include a copper or aluminum-magnet wire coated with a thin polymer film for electrical insulation. Non-limiting examples of permanent magnet materials that may be used include hard-magnetic ferrites, neodymium iron boron, and samarium cobalt. Fasteners and bonding agents may be selected as appropriate to withstand the required operating environment.

The VCA 100 may employ feedback for closed-loop control and for precise movement of the VCA pin 120. Position, velocity, and/or force transducers may be used as feedback devices. Examples of additional feedback devices include optical encoders, contact and magneto-resistive potentiometers, LVDTs (linear variable differential transformers), and load cells. In addition or alternatively, capacitive, linear magnetic, and/or inductive sensors may be employed by the VCA 100.

Figure 7:
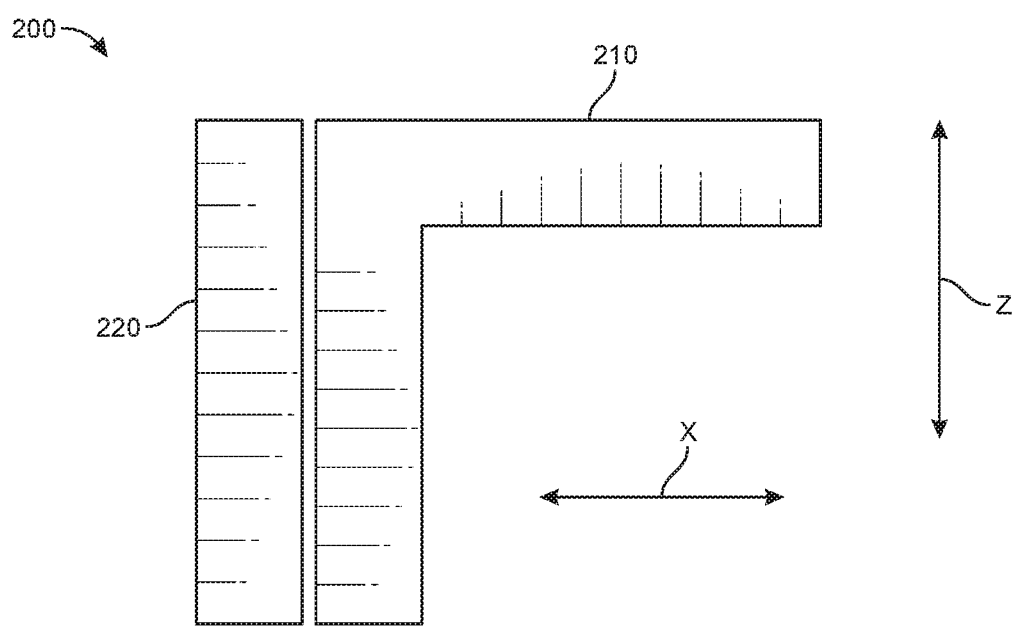
FIG. 7 is a side view of an asymmetric component to be translated relative to a support structure, according to at least one embodiment of the present disclosure.

FIG. 7 depicts an assembly 200, including an asymmetric component 210 to be translated relative to a support structure 220, to illustrate certain concepts of the present disclosure. For example, the asymmetric component 210 may be a projector assembly (e.g., a projector and an optical combiner) and the support structure 220 may be an HMD frame. As shown in FIG. 7, the asymmetric component 210 is to be translated in an X-direction and/or in a Y-direction (in and out of the page from the perspective of FIG. 7) with respect to the support structure 220. Translation of the asymmetric component 210 in a Z-direction, in this example, may be inhibited (e.g., minimized, restricted, precluded). In the context of the HMD systems of the present disclosure, the asymmetric component 210 may be or include a projector assembly, which may include one or both of a projector and an optical combiner, and the support structure 220 may be or include a temple of an HMD frame in an eyeglass configuration. The translation in the X- and/or Y-directions may be accomplished by one or more VCAs, as further described below.

Figure 8:
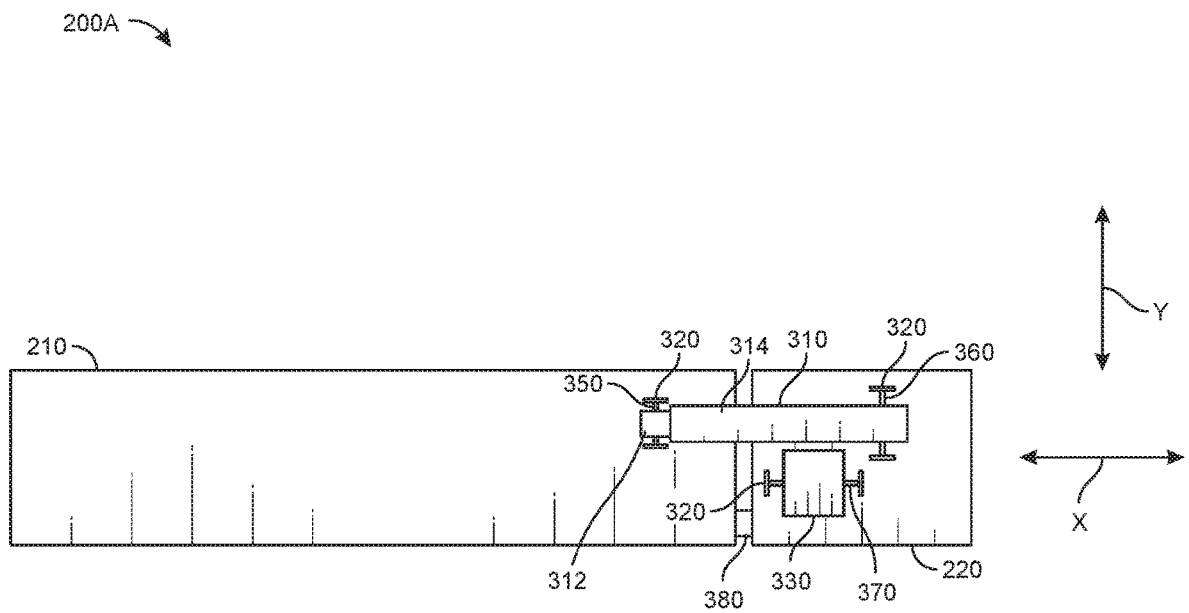
FIG. 8 is a top view of an example mechanism for translating an asymmetric component relative to a support structure, according to at least one embodiment of the present disclosure.

FIG. 8 depicts an assembly 200A including the asymmetric component 210 (e.g., a projector assembly) and the support structure 220 (e.g., the temple of an HMD frame) according to some embodiments of the present disclosure. The assembly 200A may include a first VCA 310 having a first VCA pin 312 and a first VCA base 314 and a second VCA 330 having a second VCA pin 332 and a second VCA base 334. As shown in FIG. 8, the first VCA base 314 may be attached to the support structure 220 and the first VCA pin 312 may be attached to the asymmetric component 210 in a manner to cause X-direction translation of the asymmetric component 210 relative to the support structure 220 upon actuation of the first VCA 310. Various mechanisms for attachment of the first VCA 310 may be used. For example, the first VCA pin 312 may be mounted to the asymmetric component 210 via a rod 350 attached to a pair of a brackets 320, and the first VCA base 314 may be attached to the support structure 220 in a similar fashion, but with a longer rod 360. The first VCA 310 may be movable along the longer rod 360 for movement of the asymmetric component 210 in the Y-direction. Other examples of attaching the components of the first VCA 310 to the asymmetric component 210 and/or support structure 220 may include adhesives, soldering/welding, and various other bracket arrangements.

The second VCA base 334 may be attached to the support structure 220 using, for example, a rod 370 and a pair of brackets 320, with the second VCA pin 332 attached to the first VCA base 314. The first VCA 310 may be movable along the longer rod 360 for movement of the asymmetric component 210 in the Y-direction when the second VCA 330 is actuated. Such Y-direction movement of the first VCA 310 may result in movement of the asymmetric component 210 in the Y-direction. Thus, actuation of the first VCA 310 and second VCA 330 may cause any combination of X- and Y-translation (including only X-translation and only Y-translation). In other examples, the housings and actuators of the VCAs may be attached in other configurations (for example, the first VCA pin 312 may be attached to the support structure 220 and the first VCA base 314 may be attached to the asymmetric component 210, etc.) and the VCAs 310, 330 may be connected differently (for example, the second VCA 330 may be moved in the X-direction by the first VCA 310, which may have one end attached to the second VCA 330, etc.). The second VCA 330 may be fixed to the first VCA 310 and may slide on the rod 370 or may slide along the first VCA 310.

In some embodiments, the HMD systems of the present disclosure may include a locking system that is configured to lock a projector assembly in a translated position, such as upon powering down VCA(s) of the HMD systems. For example, FIG. 8 depicts a locking system 380 positioned between the asymmetric component 210 (e.g., a projector assembly) and the support structure 220 (e.g., an HMD frame). The locking system 380 may include, for example, an actuator for engaging the asymmetric component 210 after being translated by the first and second VCAs 310, 330. The actuator may include a pin, a paddle, a shape-memory alloy material, a bi-stable solenoid, a stepper motor and leadscrew, etc.

Figure 9:
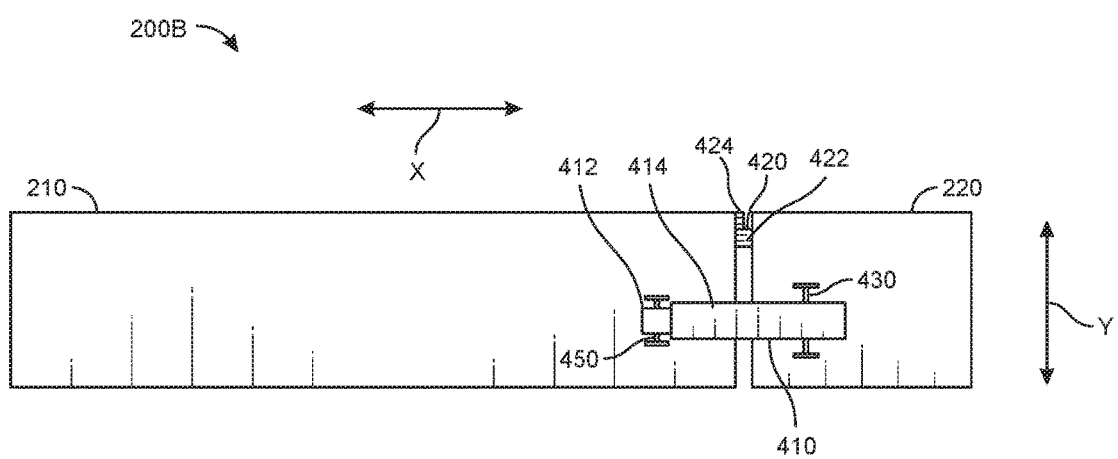
FIG. 9 is a top view of an example mechanism for translating an asymmetric component relative to a support structure, according to at least one additional embodiment of the present disclosure.

FIG. 9 depicts another example of an assembly 200B including the asymmetric component 210 (e.g., a projector assembly) and the support structure 220 (e.g., the temple of an HMD frame) according to additional embodiments of the present disclosure. In the example depicted in FIG. 9, the assembly 200B may include a first VCA 410 having a first VCA pin 412 and a first VCA base 414 and a second VCA 420 having a second VCA pin 422 and a second VCA base 424. The first VCA pin 412 may be attached to the asymmetric component 210 and the first VCA base 414 may be attached to the support structure 220. In one example, the first VCA base 414 may be movable along a mounting rod 430, such as in the Y-direction. Thus, the first VCA 410 may be configured to translate the asymmetric component 210 in the X-direction with respect to the support structure 220 upon activation of the first VCA 410. The second VCA 420 may be mounted between the asymmetric component 210 and the support structure 220 with, for example, the configuration depicted in FIGS. 10A and 10B or the configuration depicted in FIGS. 11A and 11B. The second VCA 420 may be configured to translate the asymmetric component 210 (and the first VCA base 414) in the Y-direction with respect to the support structure 220 upon activation of the second VCA 420.

Figure 10A:
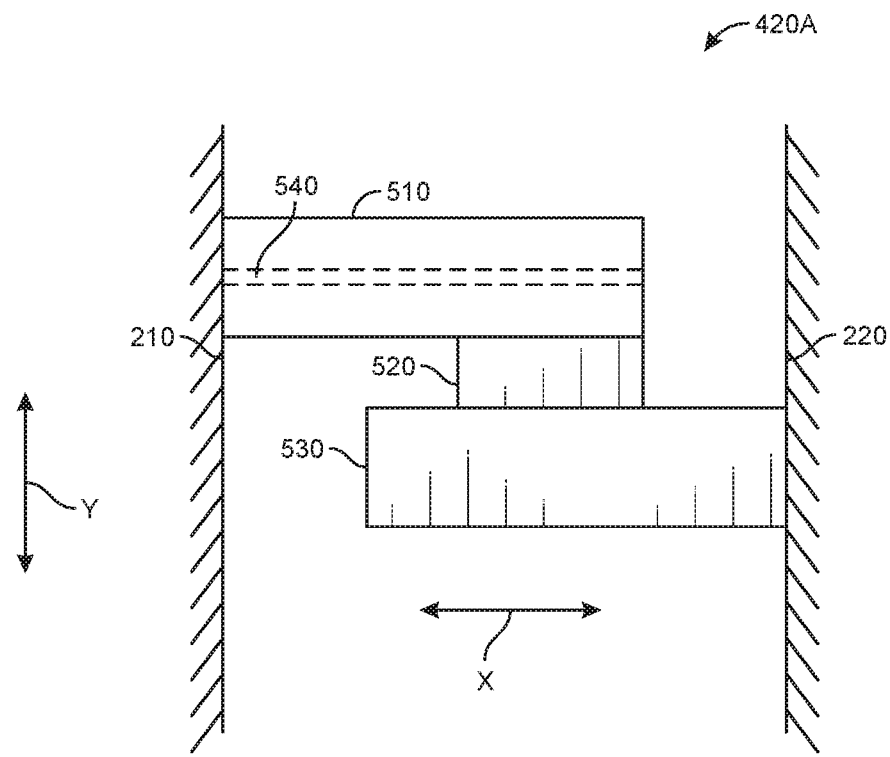
FIGS. 10A and 10B are detailed views of a mechanism for translating an asymmetric component relative to a support structure, according to at least one embodiment of the present disclosure.
Figure 10B:
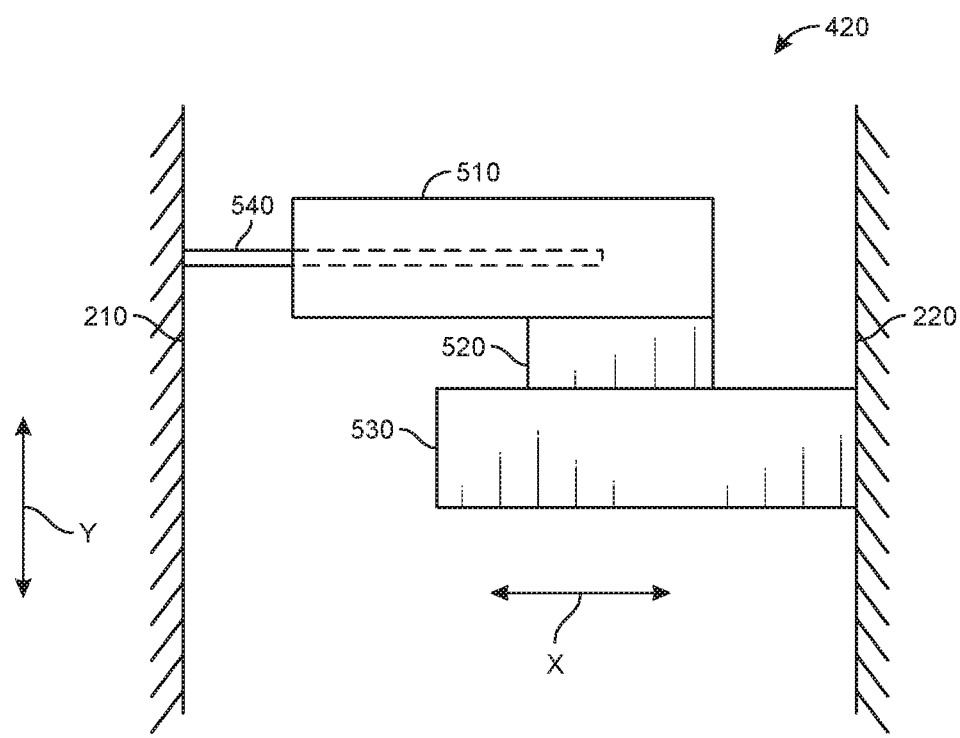

FIGS. 10A and 10B depict an example of a VCA 420A that may be used for the second VCA 420 shown in FIG. 9. The VCA 420A may include a VCA pin 520 that is movable relative to a VCA base 530 in the Y-direction. The VCA base 530 may be fixedly attached to the support structure 220. A slider 510, which may be attached to the VCA pin 520 (or which may be a part of the VCA pin 520), may be configured to slide along a rod 540, which may be attached to the asymmetric component 210. When the VCA pin 520 moves in the Y-direction, the resultant force may act on the slider 510 and may cause the asymmetric component 210 to be translated in the Y-direction relative to the support structure 220. When the asymmetric component 210 is translated in the X-direction by the first VCA 410 (FIG. 9), the slider 510 may slide along the rod 540 in the X-direction (see FIG. 10B).

Figure 11A:
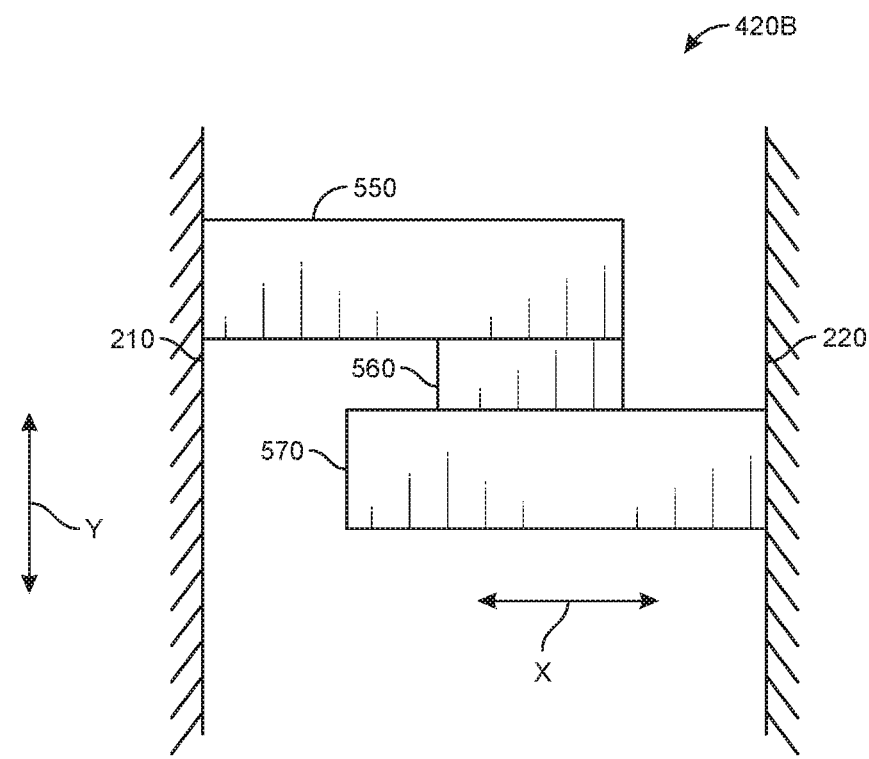
FIGS. 11A and 11B are detailed views of a mechanism for translating an asymmetric component relative to a support structure, according to at least one additional embodiment of the present disclosure.
Figure 11B:
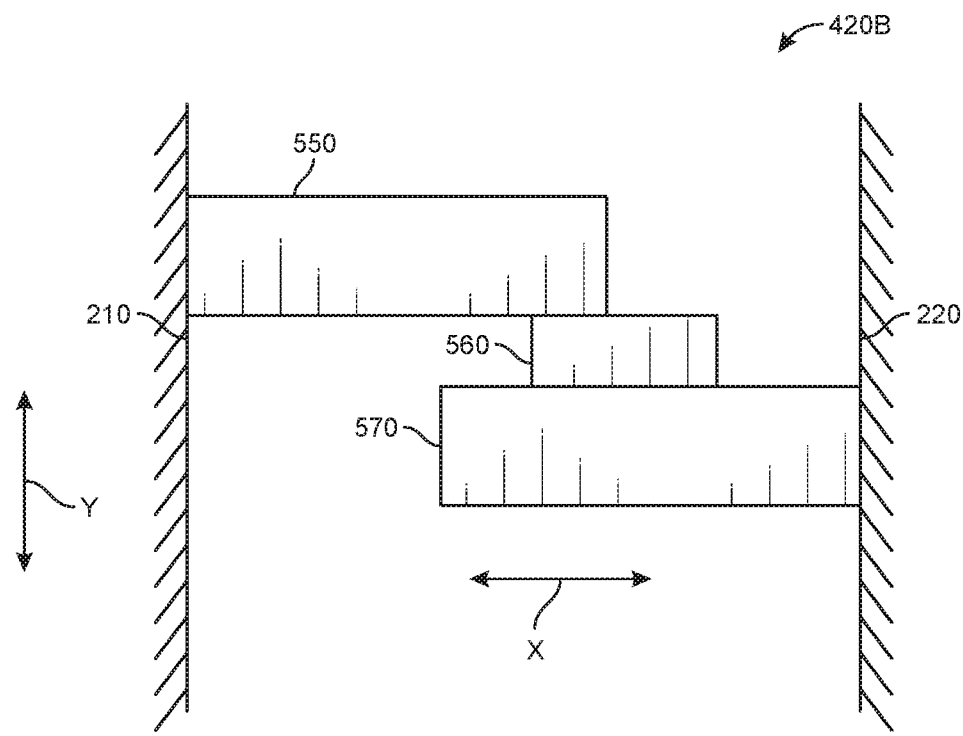

FIGS. 11A and 11B depict another example of a VCA 420B that may be used for the second VCA 420 shown in FIG. 9. The VCA 420B may include a VCA base 570 and a VCA pin 560 that is movable relative to the VCA base 570 when the VCA 420B is actuated. The VCA base 570 may be fixedly attached to the support structure 220. As shown in FIGS. 11A and 11B, an extension 550 may protrude from the asymmetric component 210 to provide a surface against which a VCA pin 560 may abut. The extension 550 may be attached to the asymmetric component 210 or may be an integral part of the asymmetric component 210. In some embodiments, the extension 550 and asymmetric component 210 may be biased against the VCA pin 560, such as with a coil spring or leaf spring, etc. In additional embodiments, the VCA pin 560 and the extension 550 may be engaged with each other, such that retraction of the VCA pin 560 toward the VCA base 570 will pull the extension 550 and asymmetric component 210. For example, the VCA pin 560 and the extension 550 may be coupled to each other with a tongue-and-groove joint or a dovetail joint, etc. The VCA pin 560 may be able to slide relative to the extension 550 in the X-direction upon actuation of the first VCA 410 (FIG. 9). Extending and retracting the VCA pin 560 may move the asymmetric component 210 in the Y-direction relative to the support structure 220.

Figure 12:
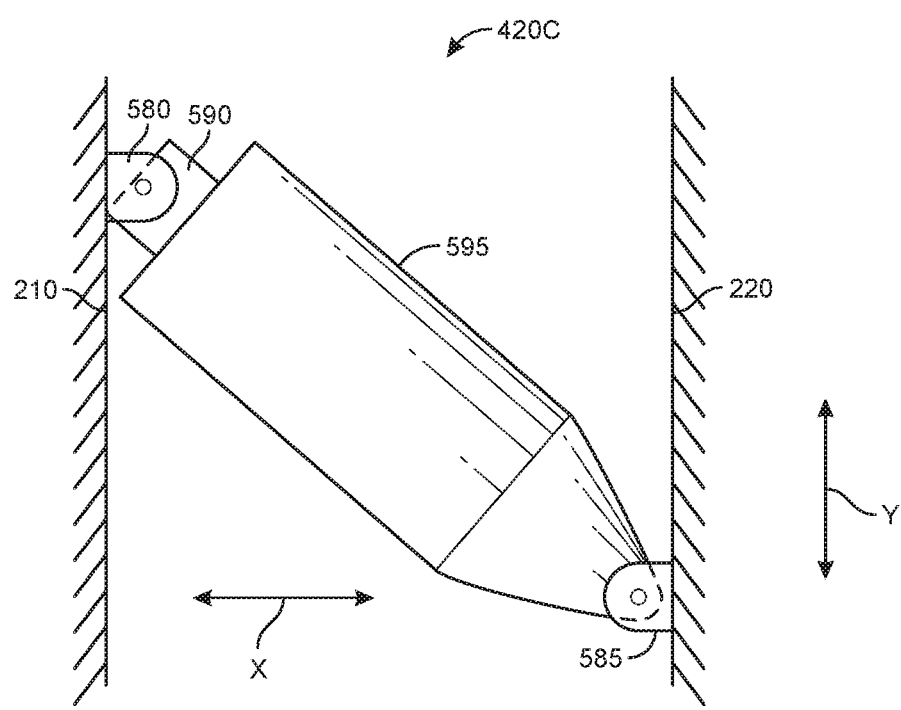
FIG. 12 is a detailed view of a mechanism for translating an asymmetric component relative to a support structure, according to at least one further embodiment of the present disclosure.

FIG. 12 depicts another example of a VCA 420C that may be used for the second VCA 420 shown in FIG. 9. The VCA 420C may include a VCA pin 590 that is movable when actuated relative to a VCA base 595. The VCA pin 590 and the VCA base 595 of the VCA 420C may be respectively attached to the asymmetric component 210 and the support structure 220 using rod-bracket structures 580, 585, which may be similar to the brackets 320 and rods 350, 360, and 370 depicted in FIG. 8. Referring to FIG. 12, when the asymmetric component 210 is translated in the X-direction by the first VCA 410 (FIG. 9), the VCA 420C may rotate about the rod-bracket structures 580, 585. Some extension or retraction of the VCA pin 590 may occur if translation in only the X-direction is desired. Translation of the asymmetric component 210 in the Y-direction may be accomplished by actuating the VCA 420C and/or rotating the VCA 420C about the rod-bracket structures 580, 585.

Due to the asymmetric mass distribution of the projector assemblies and the location of the VCAs according to the present disclosure, torque caused by X- and/or Y-translation may tend to result in translation of the projector assembly or a portion thereof in a Z-direction (that is, a direction orthogonal to a plane defined by the X- and Y-directions) and/or may tend to result in rotation of the projector assembly. To inhibit (e.g., control, minimize, reduce, restrict, preclude, etc.) such movement in the Z-direction and/or rotation, HMD systems of the present disclosure may employ a guidance system.

Figure 13:
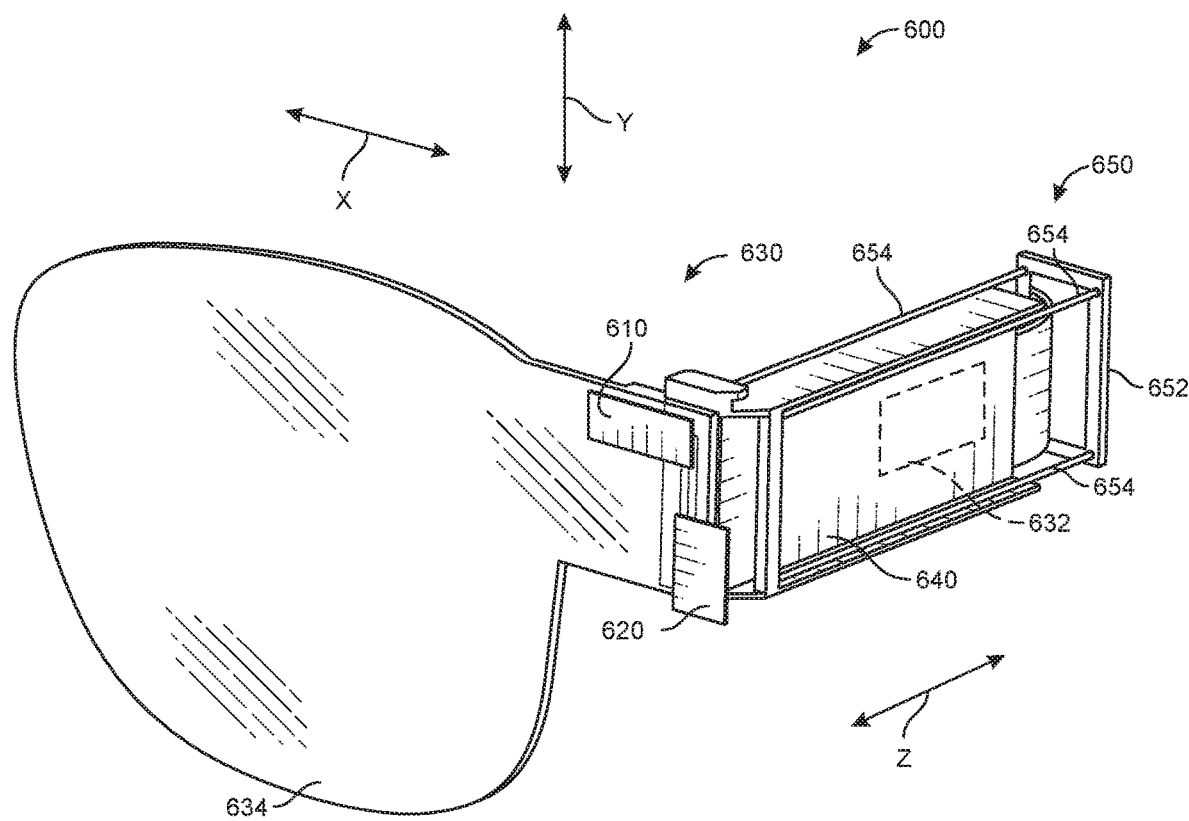
FIG. 13 is a perspective view of a projector assembly and a flexure guidance system, according to at least one embodiment of the present disclosure.

FIG. 13 depicts an example flexure guidance system 600. As depicted in FIG. 13, a first VCA 610 (for translation in the X-direction) and a second VCA 620 (for translation in the Y-direction) may be coupled to an asymmetric projector assembly 630 and to a temple 640 of an HMD frame. The projector assembly 630 may include a projector 632 and an optical combiner 634. The first and second VCAs 610, 620 may be configured to move the asymmetric projector assembly 630 in the X-direction and/or in the Y-direction relative to the temple 640. A flexure guidance structure 650 may include a base 652 and four guidewires 654 extending from the base 652. The base 652 may be rigidly coupled to the temple 640. Opposing ends of the guidewires 654 may be coupled to the projector assembly 630. The guidewires 654 may be sufficiently flexible to allow for movement of the projector assembly 630 in the X- and Y-directions. However, the configuration of the flexure guidance structure 650 may inhibit substantial movement of the projector assembly 630 in the Z-direction and/or rotation of the projector assembly 630 relative to the base 652 and temple 640.

Figure 14B:
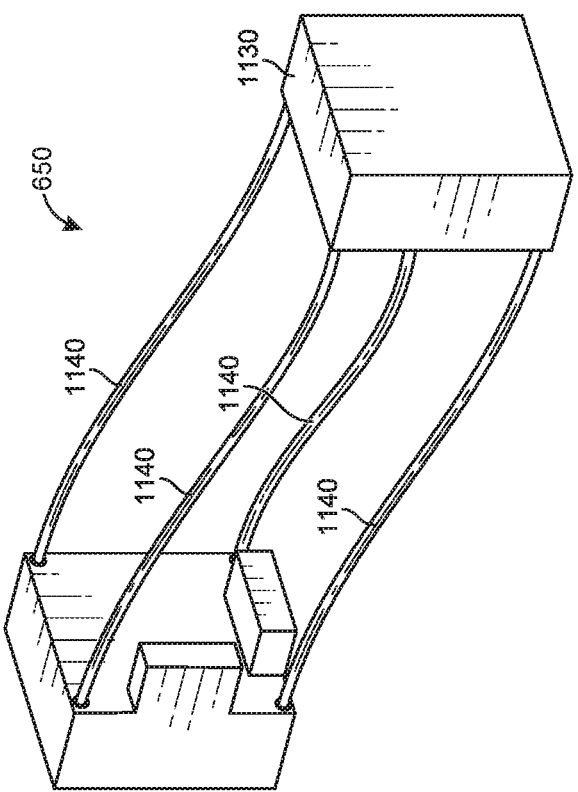
FIGS. 14A and 14B are detailed views of the flexure guidance system of FIG. 13.
Figure 14A:
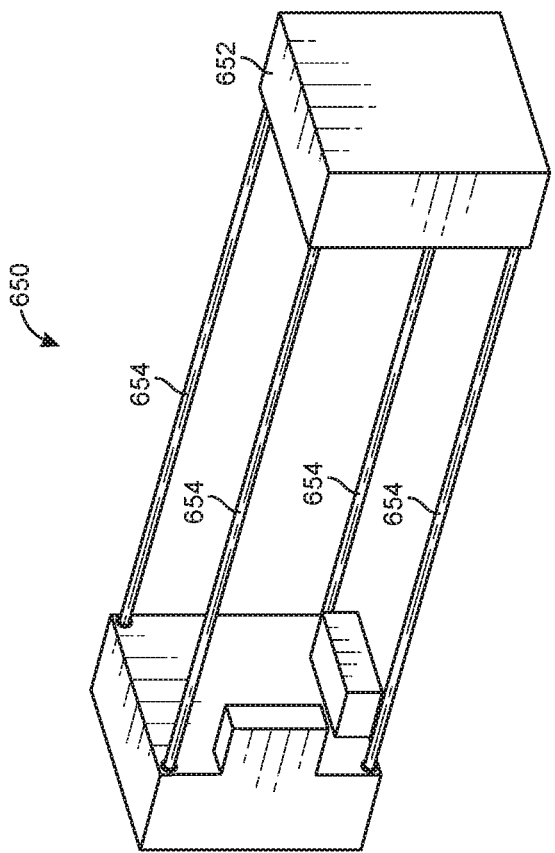

The flexure guidance system 600 may provide substantially uniform stiffness in the X- and Y-directions and may keep the ends of the guidewires 654 substantially parallel to each other when the projector assembly 630 is translated in the X- and Y-directions, even though the guidewires 654 may be flexing. Thus, movement in the Z-direction or rotation of the projector assembly 630 may be inhibited. In other embodiments, an array of more than four guidewires 654 may be employed. FIGS. 14A and 14B depict an example embodiment of the flexure guidance structure 650, respectively at rest and in a flexed position.

Figure 15A:
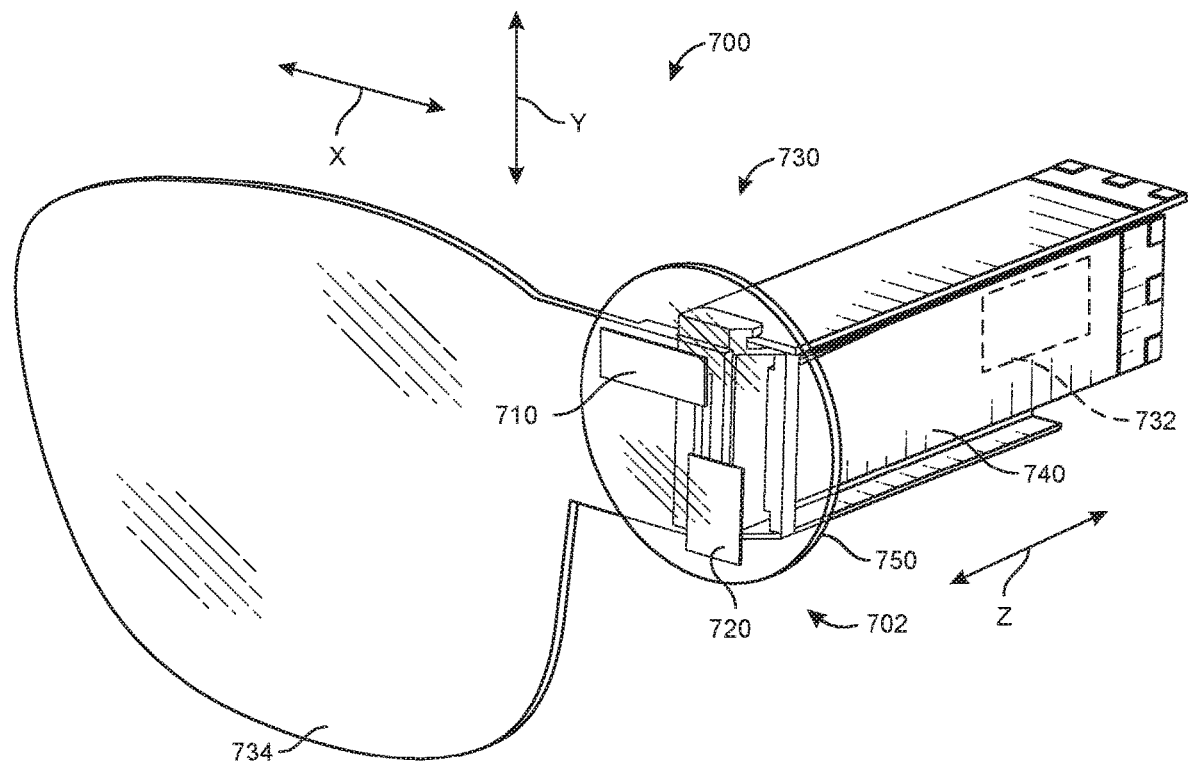
FIGS. 15A and 15B are perspective views of a guidance system for guiding translation of a component of an HMD system, according to at least one embodiment of the present disclosure.
Figure 15B:
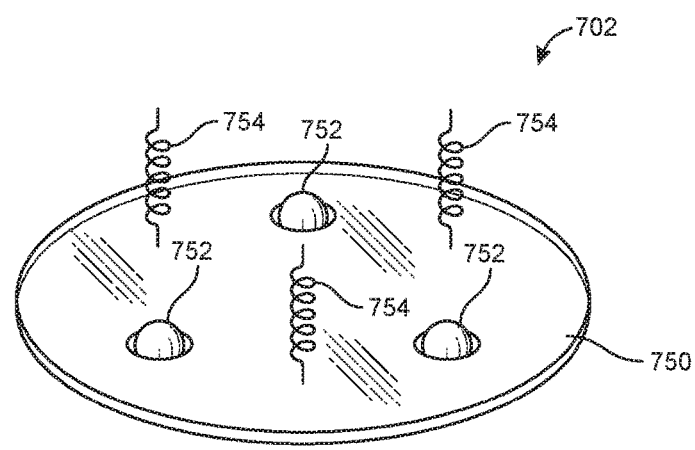

FIGS. 15A and 15B depict an example HMD assembly 700 that may employ a ball-bearing and spring guidance system 702. As depicted in FIG. 15A, a first VCA 710 (for translation in the X-direction) and a second VCA 720 (for translation in the Y-direction) may be attached to an asymmetric projector assembly 730 and to a temple 740 of an HMD frame. The projector assembly 730 may include a projector 732 and an optical combiner 734. The spring guidance system 702 may include a plate 750 (depicted in FIGS. 15A and 15B as transparent for clarity) and ball bearings 752 (see FIG. 15B) cradled in stationary cups or recesses in the plate 750. The plate 750 may be attached to the temple 740. Tension springs 754 may be used to bias the plate 750 and ball bearings 752 against the projector assembly 730 (e.g., against a portion or extension of the optical combiner 734). The spring guidance system 702 may inhibit movement in the Z-direction and/or rotation of the projector assembly 730. In an alternative embodiment, movement in the Z-direction may be constrained by the plate 750 only (i.e., without the ball bearings 752).

Figure 16A:
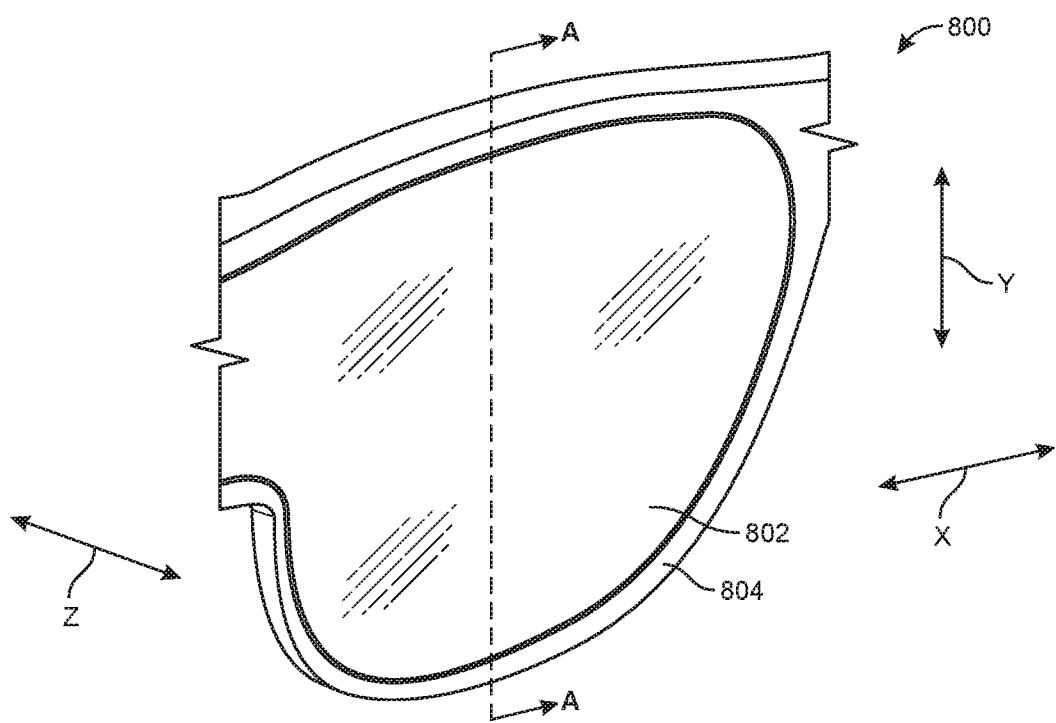
FIGS. 16A and 16B are, respectively, perspective and cross-sectional views of a guidance system for guiding translation of a component of an HMD system, according to at least one additional embodiment of the present disclosure. The cross-sectional view of FIG. 16B is taken from line A-A in FIG. 16A.
Figure 16B:
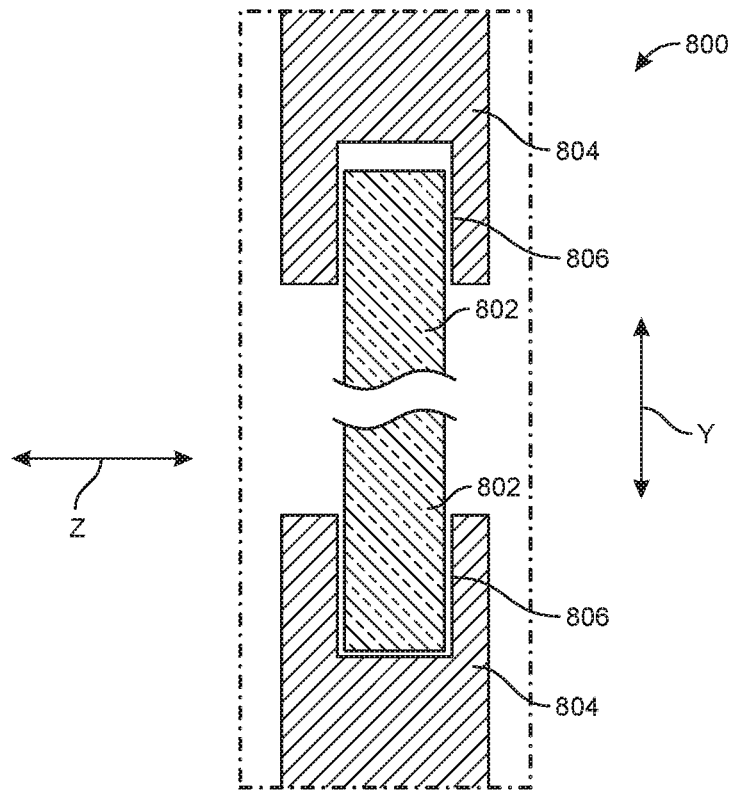

FIGS. 16A and 16B show an example HMD system 800 including an optical combiner 802 and an HMD frame 804. The HMD frame 804 may include a groove 806 (FIG. 16B) within which an edge of the optical combiner 802 may be seated. The optical combiner 802 may be guided by the groove 806, inhibiting movement in the Z-direction and rotation of the optical combiner 802 while allowing movement of the optical combiner 802 in the X- and Y-directions.

Figure 17A:
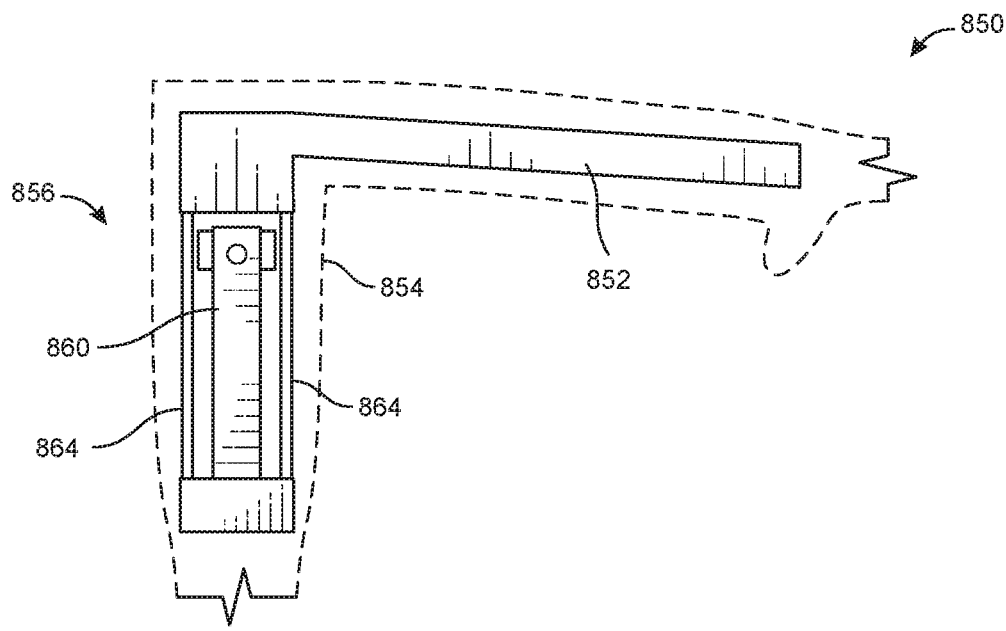
FIGS. 17A and 17B are, respectively, top and perspective views of a guidance system for guiding translation of a component of an HMD system, according to at least one other embodiment of the present disclosure.
Figure 17B:
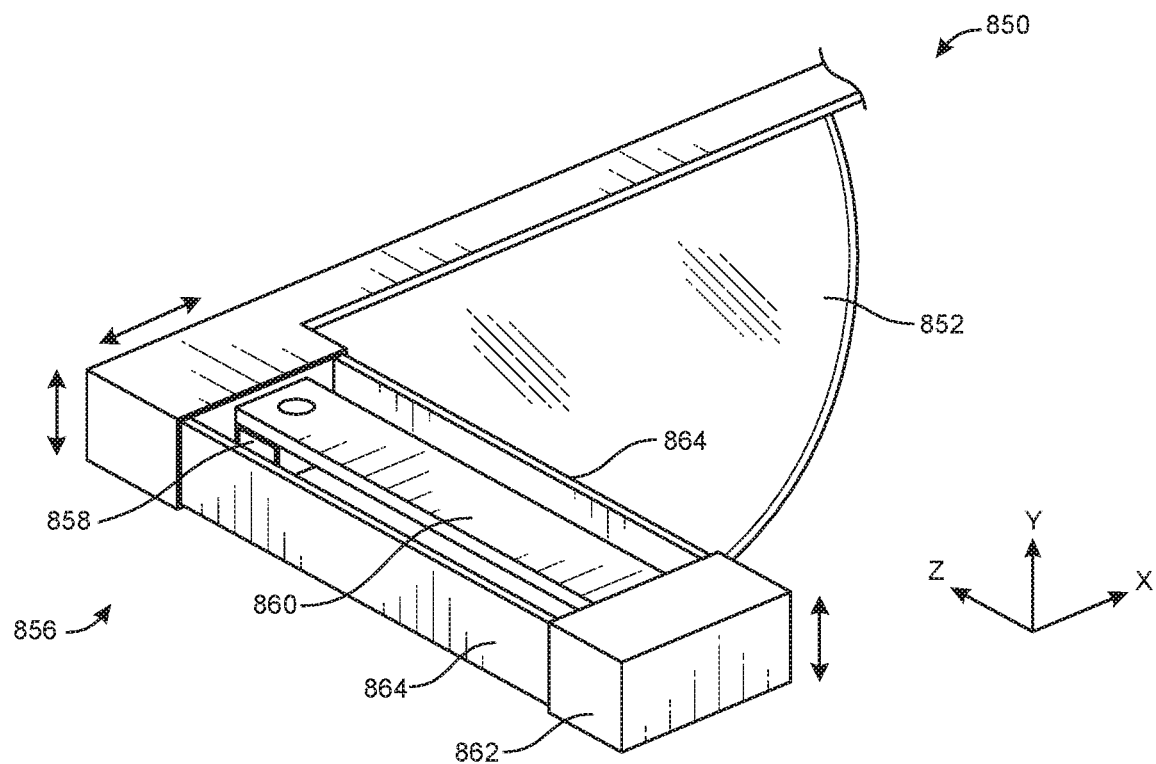

FIGS. 17A and 17B show an example HMD system 850 including an optical combiner 852 and an HMD frame 854, according to additional embodiments. The optical combiner 852 may be movably coupled to the HMD frame 854 via a flexure guidance subsystem 856. The flexure guidance subsystem 856 may include a frame coupler 858 for fixedly coupling to the HMD frame 854, at least one vertical flexure beam 860 extending from the frame coupler 858 and configured to flex vertically, a rear block 862 coupled to an end of the vertical flexure beam 860 opposite the frame coupler 858, and at least one horizontal flexure beam 864 extending from the rear block 862 to the optical combiner 852 and configured to flex horizontally.

As illustrated in FIG. 17B, flexing of the vertical flexure beam(s) 860 may cause the rear block 862 to move vertically. Vertical movement (e.g., in the Y-direction) of the rear block 862 may result in vertical movement of the horizontal flexure beam(s) 864 and of the optical combiner 852. Flexing of the horizontal flexure beam(s) 864 may cause the optical combiner 852 to move horizontally (e.g., in the X-direction). Thus, controlling vertical flexing of the vertical flexure beam(s) 860 and horizontal flexing of the horizontal flexure beam(s) 864 may enable control of movement of the optical combiner 852 in both horizontal and vertical directions relative to the HMD frame 854. A stiffness of the vertical and horizontal flexure beams 860, 864 along their respective widths may facilitate control of movement off-axis, such as may otherwise result from torsion when moving the optical combiner 852.

In some embodiments, the vertical flexure beam(s) 860 and the horizontal flexure beam(s) 864 may be or include electroactive material, such as a piezoelectric material, an electroactive polymer material, or a dielectric elastomer material. In this example, actuation of the vertical flexure beam(s) 860 and the horizontal flexure beam(s) 864 may be used to move the optical combiner 852. In additional embodiments, the vertical flexure beam(s) 860 and the horizontal flexure beam(s) 864 may be a passive (i.e., non-electroactive), flexible material (e.g., polymer, metal, ceramic, composite, etc.), and movement may be provided by one or more additional actuators. For example, a vertical linear actuator (e.g., a voice coil actuator, a piezoelectric stack, etc.) may be positioned and configured to act on the rear block 862, and a horizontal linear actuator (e.g., a voice coil actuator, a piezoelectric stack, etc.) may be positioned and configured to act on the optical combiner 852.

Figure 18:
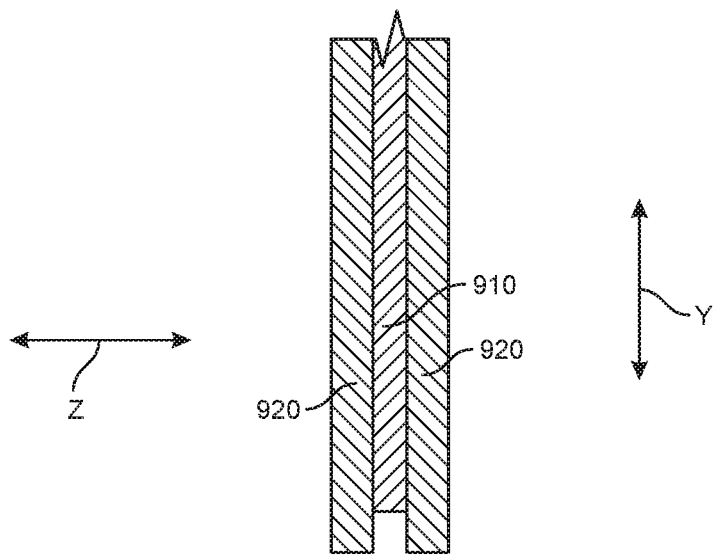
FIG. 18 is a cross-sectional view of a guidance system for guiding translation of a component of an HMD system, according to at least one further embodiment of the present disclosure.

Additionally or alternatively, as shown in FIG. 18, an optical combiner 910 may be held within a frame by a pair of other lenses 920, with sufficient clearance to allow for translation of the optical combiner 910 in the X- (in and out of the page from the view of FIG. 18) and/or Y-directions while inhibiting movement in the Z-direction and/or rotation of the optical combiner 910. Bearings and/or other friction-reducing elements (such as lubrication) may be used to aid movement of the optical combiner 910 within the pair of other lenses 920.

Figure 19:
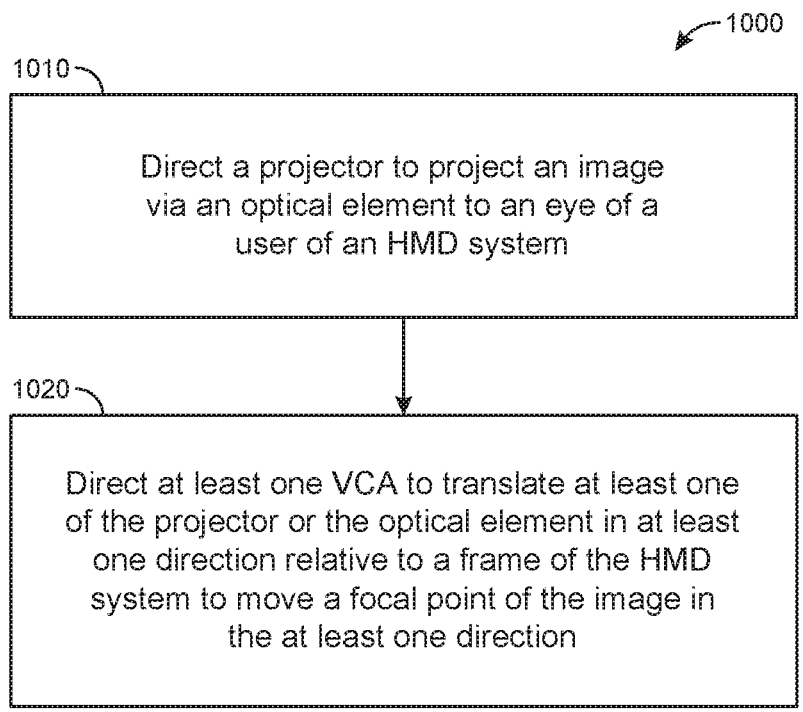
FIG. 19 is a flow diagram illustrating an example method for translating an optical component of a head-mounted display system, according to at least one embodiment of the present disclosure.
Figure 20:
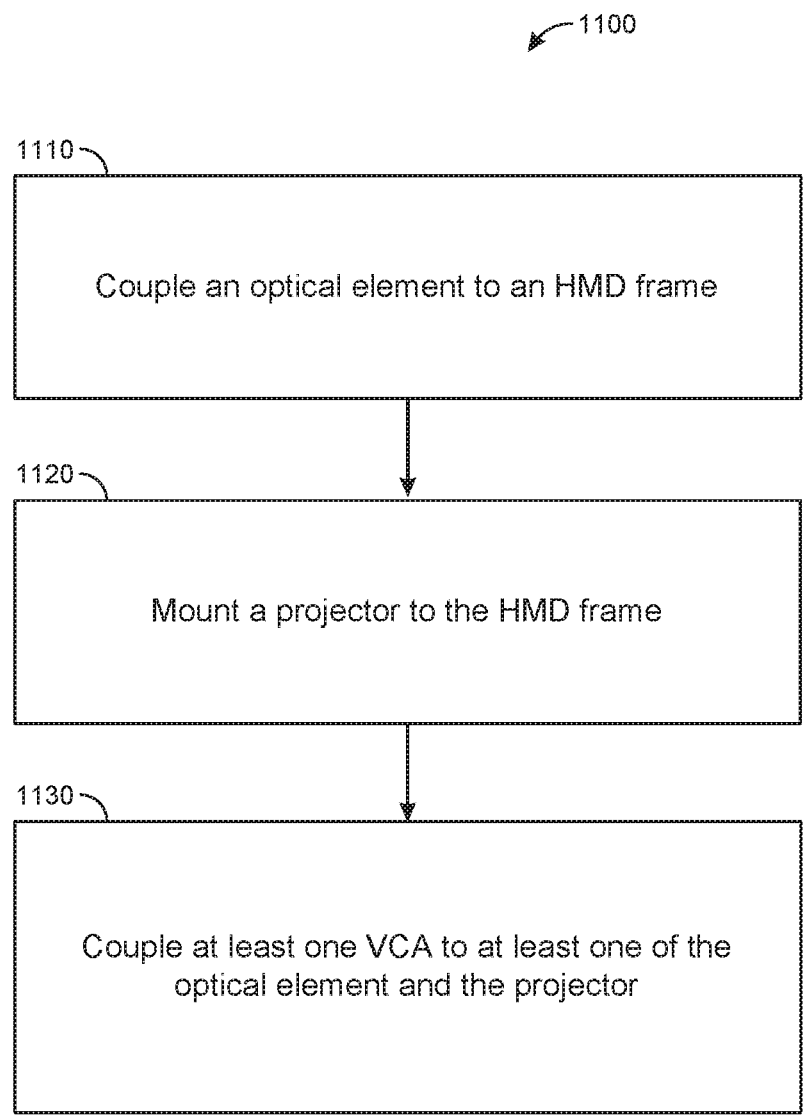
FIG. 20 is a flow diagram illustrating an example method of manufacturing a head-mounted display system, according to at least one embodiment of the present disclosure.

FIG. 19 is a flow diagram of a method 1000 for translating an optical component (e.g., a projector assembly) of a head-mounted display system according to some embodiments of the present disclosure. The operations shown in FIG. 19 may be performed by any suitable computer-executable code and/or computing system, including the system(s) described above. In one example, each of the operations shown in FIG. 19 may represent an algorithm whose structure includes and/or is represented by multiple sub-steps, examples of which will be provided in greater detail below.

As illustrated in FIG. 19, at operation 1010 one or more of the systems described herein may direct a projector to project an image via an optical element (e.g., an optical combiner) to an eye of user of the head-mounted display system. The optical element may be positioned in front of the eye of the user. The projector may project the image from a location along a temple of an eyeglass frame of the HMD system.

In operation 1020, one or more of the systems described herein may direct at least one VCA to translate at least one of the projector or the optical element in at least one direction relative to a frame of the HMD system. The translation may move a focal point of the displayed image in the at least one direction, such as to move a pupil replication to be or remain directed to a pupil of the eye of the user. Movement of the at least one of the projector or the optical element may be constrained in a direction that is transverse to the at least one direction of translation. In some examples, the translation may be performed by a first VCA in a first direction and by a second VCA in a second direction that is transverse (e.g., at least substantially perpendicular) to the first direction. The first VCA may translate both of the projector and the optical element in the first direction, and the second VCA may likewise translate both of the projector and the optical element in the second direction. At least one of the first and/or second directions may be parallel to a major surface of the optical element. In one example, the first direction may be substantially horizontal, and the second direction may be substantially vertical when the HMD system is in its normal use and orientation.

In some embodiments, the method 1000 may also include directing an eye-tracking element to track movement of a pupil of the eye of the user, and the translation of the at least one of the projector or the optical element may be in response to the tracked eye movement. A locking system may be directed to lock the at least one of the projector or the optical element in a translated position.

FIG. 20 is a flow diagram illustrating a method 1100 of manufacturing an HMD system. In operation 1110, an optical element (e.g., an optical combiner) may be coupled to an HMD frame of the HMD system. For example, the optical element may be movable in at least two directions (e.g., horizontally and vertically) relative to the HMD frame, but may be constrained from movement in a third direction (e.g., in a direction transverse/orthogonal to a plane defined by the at least two directions).

In operation 1120, a projector may be mounted to the HMD frame. The projector may be configured and oriented to project an image to an eye of a user of the HMD system via the optical element. For example, the projector may be mounted along a temple of the HMD frame (e.g., an eyeglass frame).

In operation 1130, at least one VCA may be coupled to at least one of the optical element and the projector (e.g., to a projector assembly including the optical element and the projector). The at least one VCA may, when actuated, translate at least one of the optical element and the projector in at least one direction (e.g., horizontally and/or vertically) relative to the HMD frame.

In some embodiments, the method 1100 may also include mounting an eye-tracking element (e.g., a sensor, a camera, an infrared camera, an infrared light source, etc.) to the HMD frame. The eye-tracking element may be configured and oriented to track movement of the user's eye as the user looks in different directions.

Operations described herein may be performed under control of a processor component of an artificial reality (e.g., augmented reality) system. In an embodiment, the processor may be programmed to control one or more VCAs to translate a projector assembly in response to one or more sensors that track, for example, eye movement of a user. In an embodiment, the processor may be programmed to direct translation of the projector assembly in accordance with data stored in a memory with which the processor is in communication in order to, for example, adjust a projector assembly in accordance with user-specific data. More generally, elements described herein and/or combinations thereof may be controlled by a processor.

Accordingly, the systems and methods of the present disclosure may enable improved functioning of HMD systems, such as those shown and described herein. Additionally, the user experience may be improved by mechanically moving images displayed by the HMD systems with sufficient speed and precision to substantially correspond to movements of the user's eyes, providing an immersive user experience.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data (e.g., data from an eye-tracking sensor, position data, etc.) to be transformed, transform the data, output a result of the transformation to identify a location to translate a component of an HMD system, use the result of the transformation to position a pupil replication to be directed to a pupil of an eye of a user, and store the result of the transformation to perform future translations of the component. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the present disclosure may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to," "coupled to," and "attached to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A head-mounted display system, comprising:
an optical element supported by a head-mounted display frame comprising an eyeglass frame, wherein the opti- cal element is positioned within the eyeglass frame to be held in front of an eye of a user of the head-mounted display system;
a projector that is mounted to the head-mounted display frame at a temple region of the eyeglass frame and that is configured to project, via the optical element, an image toward the eye of the user of the head-mounted display system, wherein the optical element and the projector form a projector assembly; and
at least one voice coil actuator mounted on the head-mounted display frame and coupled to at least one of the projector or the optical element such that the at least one voice coil actuator, when actuated, translates the projector assembly as a unit in at least one direction relative to the head-mounted display frame.

2. The head-mounted display system of claim 1, wherein the optical element comprises an optical combiner.

3. The head-mounted display system of claim 1, wherein the at least one voice coil actuator comprises:
a first voice coil actuator that, when actuated, translates at least one of the projector or the optical element in a first direction; and
a second voice coil actuator that, when actuated, translates at least one of the projector or the optical element in a second direction that is at least substantially perpendicular to the first direction.

4. The head-mounted display system of claim 1, further comprising a guidance subsystem positioned and configured to constrain translation of the at least one of the projector or the optical element in a direction that is transverse to the at least one direction in which the projector and/or the optical element is translated.

5. The head-mounted display system of claim 4, wherein the guidance subsystem comprises a flexure guidance structure including four flexure elements positioned at respective corner regions of the flexure guidance structure.

6. The head-mounted display system of claim 1,
wherein the at least one voice coil actuator, when actuated, translates the projector assembly in a direction that is at least substantially parallel to a major surface of the optical element.

7. The head-mounted display system of claim 1, further comprising an eye-tracking element configured to track a position of a pupil of the eye of the user, wherein the at least one voice coil actuator is configured to translate the at least one of the projector or the optical element to move a pupil replication of the image to be directed to the pupil of the eye of the user.

8. The head-mounted display system of claim 1, further comprising a locking system configured to lock the at least one of the projector or the optical element in a translated position at least upon powering down the at least one voice coil actuator.

9. The head-mounted display system of claim 1, wherein the projector comprises a light source and a waveguide.

10. A method for translating an optical component of a head-mounted display system, the method comprising:
directing a projector to project an image via an optical element to an eye of a user of a head-mounted display system;
directing a first voice coil actuator to translate at least one of the projector or the optical element in a first direction relative to a frame of the head-mounted display system and directing a second voice coil actuator to translate the at least one of the projector or the optical element in a second direction that is at least substantially perpendicular to the first direction to move a focal point of the image in the at least one direction; and
directing an eye-tracking element to track movement of a pupil of the eye of the user of the head-mounted display system, wherein directing the first voice coil actuator and the second voice coil actuator to translate the at least one of the projector or the optical element comprises causing a pupil replication of the image to be directed to the pupil of the eye of the user.

11. The method of claim 10, wherein the optical element comprises an optical combiner.

12. The method of claim 10, wherein the optical element is positioned in front of the eye of the user, and wherein directing the projector to project the image via the optical element comprises directing the projector to project the image from a location along a temple of an eyeglass frame.

13. The method of claim 10, further comprising constraining movement of the at least one of the projector or the optical element in a direction that is transverse to the at least one direction in which the projector and/or the optical element are translated.

14. The method of claim 10, wherein:
directing the first voice coil actuator to translate the at least one of the projector or the optical element in the first direction comprises directing the first voice coil actuator to translate the projector and the optical element in the first direction; and
directing the second voice coil actuator to translate the at least one of the projector or the optical element in the second direction comprises directing the second voice coil actuator to translate the projector and the optical element in the second direction.

15. The method of claim 10, wherein directing the first voice coil actuator to translate the at least one of the projector or the optical element in the first direction comprises directing the first voice coil actuator to translate the at least one of the projector or the optical element in a direction that is parallel to a major surface of the optical element.

16. The method of claim 10, further comprising directing a locking system to lock the at least one of the projector or the optical element in a translated position.

17. A method of manufacturing a head-mounted display system, the method comprising:
coupling an optical element to an eyeglass frame of a head-mounted display system in a position within the eyeglass frame to be held in front of an eye of a user of the head-mounted display system;
mounting a projector to a temple of the eyeglass frame in an orientation to project an image to the eye of the user from a location along the temple of the eyeglass frame via the optical element;
coupling a first voice coil actuator to at least one of the optical element or the projector such that the first voice coil actuator, when actuated, translates at least one of the projector or the optical element in a first direction relative to the head-mounted display frame; and
coupling a second voice coil actuator to at least one of the optical element or the projector such that the second voice coil actuator, when actuated, translates at least one of the projector or the optical element in a second direction that is at least substantially perpendicular to the first direction.

18. The method of claim 17, further comprising mounting an eye-tracking element to the eyeglass frame.

19. The method of claim 18, further comprising:
configuring the eye-tracking element to track a position of the eye of the user; and configuring the at least one voice coil actuator to translate at least one of the projector or the optical element to move a pupil replication of the image to be directed to the pupil of the eye of the user.

* * * * *